US009602344B1

(12) United States Patent
Iyengar et al.

(10) Patent No.: US 9,602,344 B1
(45) Date of Patent: Mar. 21, 2017

(54) AUTOMATED ESTABLISHMENT OF ACCESS TO REMOTE SERVICES

(71) Applicant: CloudVelocity, Inc., Santa Clara, CA (US)

(72) Inventors: Anand Iyengar, Belmont, CA (US); Rajeev Chawla, Union City, CA (US); Raman Chawla, Cupertino, CA (US); Panagiotis Tsirigotis, Cupertino, CA (US); Jun Kang Chin, Palo Alto, CA (US); Chung-Shang Shao, Hayward, CA (US)

(73) Assignee: CLOUDVELOX, INC., Santa Clara, CA (US)

( * ) Notice: Subject to any disclaimer, the term of this patent is extended or adjusted under 35 U.S.C. 154(b) by 521 days.

(21) Appl. No.: 14/144,485

(22) Filed: Dec. 30, 2013

(51) Int. Cl.
*H04L 29/06* (2006.01)
*H04L 12/24* (2006.01)
*H04M 3/00* (2006.01)

(52) U.S. Cl.
CPC ............... *H04L 41/0813* (2013.01)

(58) Field of Classification Search
CPC ............ H04L 63/029; H04L 12/4641; H04L 12/4675; H04L 12/4633; H04L 63/0272; H04L 63/0892; H04L 67/16; H04L 67/34; G06F 21/606; H04W 12/08; H04W 76/022; H04W 40/00
USPC ........ 709/201–203, 217–219, 220, 227–229, 709/249–250; 726/14, 1, 11, 27
See application file for complete search history.

(56) References Cited

U.S. PATENT DOCUMENTS

| | | | |
|---|---|---|---|
| 7,787,494 B1 * | 8/2010 | Aubin | H04L 12/4675 370/352 |
| 2009/0036111 A1 * | 2/2009 | Danford | H04L 41/0893 455/419 |
| 2010/0191783 A1 * | 7/2010 | Mason | G06F 17/30088 707/822 |
| 2011/0261828 A1 * | 10/2011 | Smith | H04L 12/462 370/401 |
| 2012/0096134 A1 * | 4/2012 | Suit | G06F 9/5072 709/221 |
| 2012/0096171 A1 * | 4/2012 | Suit | H04L 12/6418 709/227 |
| 2012/0096271 A1 * | 4/2012 | Ramarathinam | H04L 63/0807 713/172 |
| 2012/0281706 A1 * | 11/2012 | Agarwal | H04L 67/1002 370/395.53 |
| 2012/0281708 A1 * | 11/2012 | Chauhan | H04L 63/0272 370/401 |

(Continued)

*Primary Examiner* — Alina N Boutah
(74) *Attorney, Agent, or Firm* — Fenwick & West LLP

(57) ABSTRACT

A software application designed to operate within an enterprise system is modified to operate properly within a system of a third-party provider. In one embodiment, a site manager obtains pertinent information about the software application from the source systems that make up the enterprise system and provides it to a cloud manager, and the cloud manager uses the information to generate a modified version of the software application for use on the cloud provider. The modification may include operations such as driver injection, file system mounting customization, customization of hostname-to-network address mappings, and boot image creation. Secure connections may also be established between the enterprise system and third-party provider to allow the application running on the third-party provider to access the services of the enterprise system.

18 Claims, 7 Drawing Sheets

(56) References Cited

U.S. PATENT DOCUMENTS

| | | | | |
|---|---|---|---|---|
| 2012/0311659 | A1* | 12/2012 | Narain | H04W 12/08 726/1 |
| 2013/0054763 | A1* | 2/2013 | Van der Merwe | H04W 8/12 709/220 |
| 2013/0152169 | A1* | 6/2013 | Stuntebeck | H04L 67/16 726/4 |
| 2013/0174246 | A1* | 7/2013 | Schrecker | H04L 63/029 726/14 |
| 2013/0227137 | A1* | 8/2013 | Damola | G06F 9/5072 709/224 |
| 2013/0268643 | A1* | 10/2013 | Chang | G06F 9/45558 709/223 |
| 2013/0283364 | A1* | 10/2013 | Chang | H04L 49/70 726/12 |
| 2013/0291087 | A1* | 10/2013 | Kailash | H04L 63/1425 726/11 |
| 2013/0311778 | A1* | 11/2013 | Cherukuri | H04L 41/0803 713/171 |
| 2013/0347072 | A1* | 12/2013 | Dinha | H04L 63/0272 726/4 |
| 2014/0007222 | A1* | 1/2014 | Qureshi | G06F 21/10 726/16 |
| 2014/0108665 | A1* | 4/2014 | Arora | H04L 67/141 709/227 |
| 2014/0366155 | A1* | 12/2014 | Chang | G06F 21/10 726/27 |
| 2014/0369229 | A1* | 12/2014 | Martineau | H04L 45/02 370/254 |
| 2015/0341230 | A1* | 11/2015 | Dave | H04L 41/5058 705/7.29 |

\* cited by examiner

AUTOMATED ESTABLISHMENT OF ACCESS TO REMOTE SERVICES

TECHNICAL FIELD

The disclosed embodiments relate generally to server-based applications. In particular, the disclosed embodiments are directed to automatically reconfiguring computer software applications hosted by a given enterprise system to be hosted by a different system, such as that of a cloud provider.

BACKGROUND

Many companies and other organizations have created computer software applications designed to be hosted on their own enterprise systems. This requires the organizations to commit considerable resources to the design and maintenance of the enterprise systems that host the applications. For example, the organizations must employ many information technology professionals to ensure that the networks, storage systems, security settings, and other components of the enterprise systems continue to provide the proper levels of performance and security.

As an alternative model, a third-party provider may make its own computing systems available for hosting the organizations' applications. In this model, the third-party provider (hereinafter referred to as a "cloud provider") supplies the hardware and software systems that provide the computing, storage, and network capacity required by the software applications, configures system settings to provide proper data security, and the like. Thus, the third-party provider is responsible for the technological and administrative details necessary for the applications to properly function, freeing the organizations from the need to attend to such details. The organizations can then supply the applications to the third-party provider for hosting, compensating the third-party provider according to the resources consumed, such as a certain amount of storage space, or a certain amount of computing power.

However, it can be complex, labor-intensive, and error-prone for an organization to modify its existing applications for migration to a third party cloud computing system so that they will function properly on the systems of the third-party providers. That is, the computing environment—e.g., hardware devices, operating system types and versions, network settings, and the like—of the third-party provider's system may differ significantly from that of the organization's enterprise computing systems, and hence an application will likely need to be significantly modified if it is to function properly in the third-party environment. For example, the operating system version made available by the third-party provider might differ from that of the enterprise system, leading (for example) to an unavailability of libraries expected by the application. Similarly, the Internet Protocol (IP) addresses of the third-party provider will differ from those of the enterprise system. The names of the storage devices, and system host names, will likely differ, as well. Thus, applications that make reference to these values will cease to function properly when hosted by the third-party provider.

Additionally, for reasons such as security and efficiency it may not be acceptable to host certain services of the enterprise system within the third-party environment. Thus, the applications migrated from the enterprise to the third-party environment will need to be able to communicate with the enterprise in order to access the services that would not be available from within the third-party environment. However, it requires additional effort to configure the applications running in the third-party environment to communicate with the services hosted on the remote enterprise. This additional configuration becomes particularly tedious and error-prone when many different systems are involved in providing services for the application (and hence many different systems must be properly configured), and/or many services are used by the application.

SUMMARY

An "enterprise-based application," which includes both the software specifically written to implement the application and the operating system and other software constituting the environment in which it executes, is originally designed to operate within an enterprise system. The enterprise-based application is automatically modified to operate properly within a system of a third-party provider (referred to hereinafter as the "cloud provider"). In one embodiment, a cloud manager obtains pertinent information about the enterprise-based application from the source systems that make up the enterprise system and uses the information to generate a modified version of the enterprise-based application for use on the cloud provider.

The enterprise-based application is constructed to service a user's client device through the various interactions between the source systems in the enterprise system, such as the providing of information by a database server system, and the providing of a web page by a web server system. The cloud manager replicates the environment of the enterprise system using the information obtained from the source systems and performs a number of modifications of the enterprise-based application by modifying the replicated environments of the source systems that together make up the enterprise-based application.

In one embodiment, the modifications of the enterprise-based application include kernel file injection. Based on an operating system type and version of the source systems of the enterprise system, and optionally based on the cloud provider, kernel files required for the enterprise-based application to function properly on the cloud provider are identified, and these kernel files are then added to the replicated environments of the source systems.

In one embodiment, the modifications of the enterprise-based application include file system mounting customization. A mount table file is modified to use a unique identifier for a file system of the source system; the unique identifier may be generated and stored within metadata of the file system. When the corresponding operating system begins execution and the mount table file is analyzed to establish the file system mount points, the unique identifier is located within the file system metadata, thereby correlating the file system with the proper device name of the underlying storage, regardless of whether the device names differ between the source system and the cloud provider.

In one embodiment, the modifications of the enterprise-based application include customization of hostname-to-network address mappings. Source systems of the enterprise that are relevant to the application are identified, and a mapping between hostnames and IP addresses of the source systems within the enterprise are generated and stored in a mapping file accessed by the operating system during initialization. In one embodiment, the relevant source systems are identified at least in part by the users using a user interface that permits users to add and remove source systems and to specify their network visibility and other properties.

In one embodiment, the modifications of the enterprise-based application include boot image creation. The target operating system on the cloud provider is compared with the operating system type and version of source system(s) of the enterprise system to identify whether the operating system(s) of the source systems is not compatible with the cloud provider, e.g., sufficiently old. If so, then a set of newer boot files is copied to a boot directory (e.g., "/boot") of the replicated environments of the source systems. Additionally, in one embodiment a configuration file of a boot loader is modified to identify the device on which the root file system partition is located using the unique identifier of the file system.

With the environments of the pertinent source systems replicated and modified, the application may be executed on the cloud provider by creating an instance of each of the pertinent source systems within a virtual machine of the cloud provider. Further, multiple independent instances of the application may be made available to different users by creating, for each user, a set of instances of the pertinent source systems.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Architecture

Figure 1:
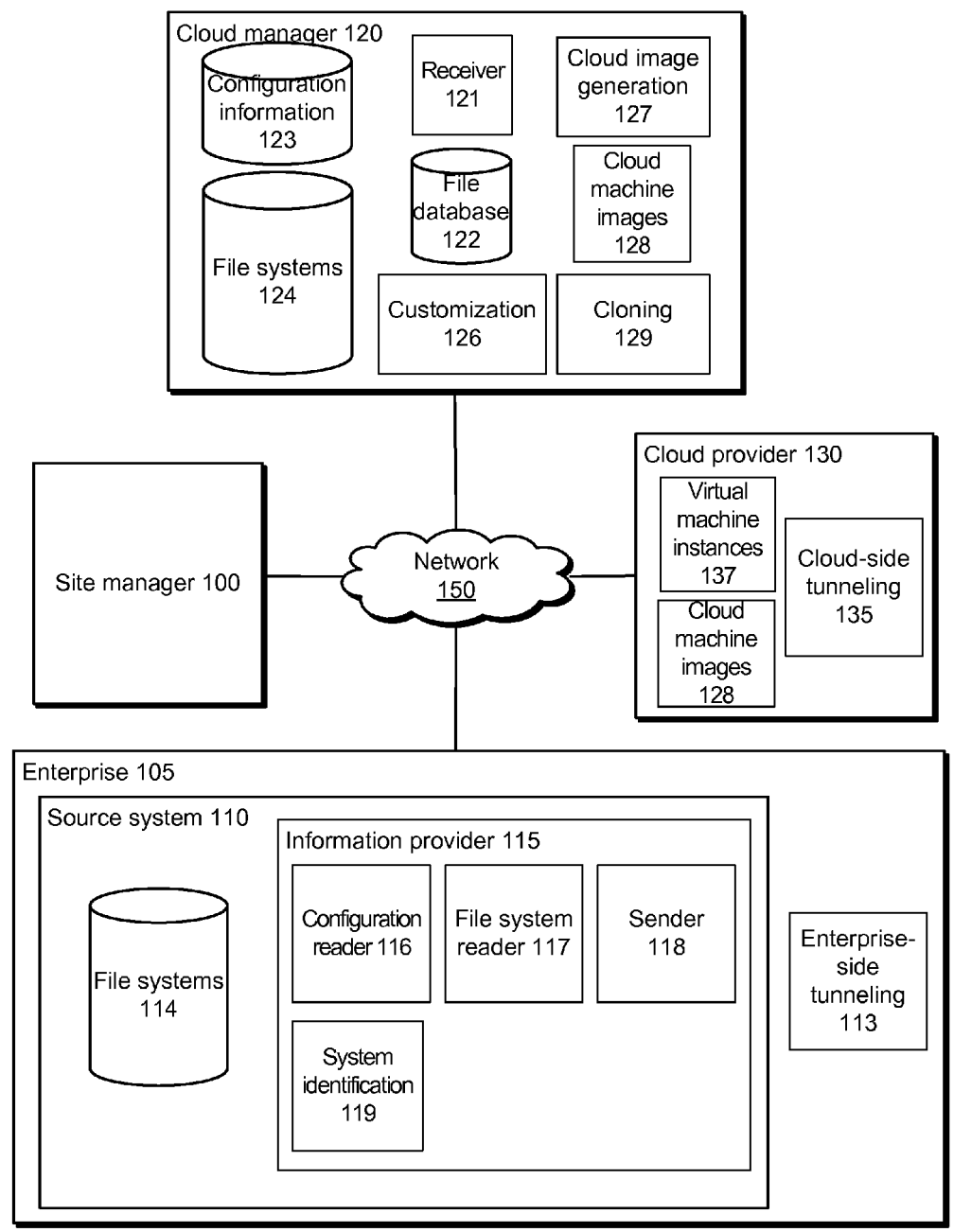
FIG. 1 shows a system environment in which an existing enterprise-based application of an organization is modified to be hosted by a cloud provider, according to one embodiment.

FIG. 1 shows a system environment in which an existing enterprise-based application of an organization is modified in order to be hosted by a cloud provider, according to one embodiment. Illustrated in FIG. 1 are an enterprise 105, an optional site manager 100, a cloud provider 130, and a cloud manager 120. The enterprise 105 represents the computing system environment for which the existing enterprise-based application was designed, and the cloud provider 130 represents a software hosting environment provided by a third party. The optional site manager 100 communicates information about the enterprise-based application (which includes the environment on the enterprise 105) to the cloud manager 120, which replicates the enterprise-based application on the cloud provider 130, including the modifications needed for the enterprise-based application to operate properly on the cloud provider 130.

More specifically, the enterprise 105 includes any number of source systems 110. The source systems 110 represent physical computing systems—such as web servers, database servers, and application servers—along with the network infrastructure that connects the source systems to each other and to external client systems. In one embodiment, the source systems 110 may also represent virtual systems defined within a virtual machine server running within the enterprise 105. The collective actions of the different source systems 110 together constitute the enterprise-based application that clients can access. For example, the actions of a database server to provide requested information, and of a web server to provide a web page graphically embodying the provided information, together might produce a particular web page of a web-based enterprise application.

The source systems 110 of an enterprise may include systems providing services, such as a database server that provides access to data of a database (e.g., in response to queries in the Structured Query Language (SQL)), a directory information server providing directory information about the enterprise (e.g., a Lightweight Directory Access Protocol (LDAP) server), or the like. For various reasons, it may be preferable for these services to remain within the enterprise, rather than to be replicated within the cloud provider 130. For example, database services might not provide the required transactional properties when replicated within the cloud provider 130, or might become out of sync with the database data stored within the enterprise 105. As another example, security policies of the enterprise 105 might dictate that directory information databases be kept within the enterprise, rather than hosted externally.

The individual source systems 110 of the enterprise 105 have given hardware and software characteristics. For example, each source system 110 has a certain amount of primary memory (RAM), a given number of processors (and/or cores within a single processor), and a set of networks to which the computer has a connection (represented by, e.g., their IP addresses). A given source system 110 also has file system characteristics, such as file system type (e.g., the ext2 or ext3 file system types for the LINUX operating system) and capacity (e.g., 2 TB).

A source system 110 comprises one or more file systems 114. The file systems 114 may contain data used or generated by the enterprise-based application, such as configuration or log files, or files created by and loaded by a database server and storing customer information, for example. The file systems 114 may also contain the code that is specific to the enterprise-based application, such as a compiled binary directly executable by a processor, intermediate compiled code executable by a virtual machine (e.g., JAVA code), scripting code interpreted by an interpreter for languages such as PYTHON or RUBY, or the like. The file systems 114 further contain the files making up the operating system environment of the source system 110, such as the operating system kernel or link libraries, and which constitute the environment of the enterprise-based application.

In one embodiment, the source systems 110 also comprise an information provider module 115 provided by the organization responsible for the site manager 100 and the cloud manager 120. The information provider module 115 of a source system 110 forms a network connection with the site manager 100 (or directly with the cloud manager 120) and provides it with information about the source system that is used to generate a cloud machine image of the source system 110. The information provider module 115 comprises submodules that perform operations such as identifying the source systems 110, obtaining the information about the source systems, and providing that information to the cloud manager 120.

Specifically, in one embodiment the information provider module 115 comprises a configuration reader module 116, a file system reader module 117, a sender module 118, and a system identification module 119.

The system identification module 119 identifies the set of source systems 110 within the enterprise 105 that are candidates for replication on the cloud provider 130. The system identification module 119 analyzes communication patterns within the enterprise 105 to identify active source systems. For example, the system identification module 119 can analyze the information provided by an operating system utility such as "netstat" to identify source systems 110, and can further automatically install the information provider module 115 on such systems. Alternatively and/or additionally, authorized users of the enterprise 105 can manually identify the relevant source systems 110 and install the information provider module 115 on those systems. In one embodiment, login information (e.g., usernames and passwords) of one or more of the source systems 110 of the enterprise 105 is provided to the system identification module 119 so that the system identification module can obtain the permissions necessary for this analysis.

The configuration reader module 116 obtains configuration information about the hardware and software characteristics of the source systems 110 within the enterprise 105. In one embodiment, the configuration information for a source system 110 includes the amount of primary memory, the number of processors, the available networks, and the type and capacity of each file system.

The file system reader module 117 obtains file system data—that is, the data stored by the file systems 114. For example, the file system reader module 117 can obtain a listing of every file within a file system, along with the data stored by those files, using local disk read system calls.

The file system reader module 117 can also determine a difference between the current state and a previous state of the file systems 114. For example, the file system reader module 117 can identify files that have changed since a given previous file system state (along with the data of the changed files), the files that have been added (along with the data of the added files), and the files that have been deleted.

The sender module 118 provides the information obtained by the configuration reader module 116 and the file system reader 117 to the site manager 100, and/or directly to the cloud manager 120, using the network 150.

The infrastructure of a cloud provider 130 may be composed of any number of physical systems, such as application servers, web servers, database servers, and the like, as well as the network infrastructure that connects the physical systems and provides network access. Examples of a cloud provider 130 include AMAZON WEB SERVICES (AWS), RACKSPACE, WINDOWS AZURE, and GOOGLE COMPUTE ENGINE.

The cloud provider 130 can simulate a physical machine by launching an instance of a virtual machine constructed based on a cloud provider-specific machine image description. The cloud machine image consists of the property description that describes the computing characteristics of the virtual machine to be launched, such as memory size, and the storage configuration that includes the number and size of the virtual storage devices and the locations of replicated data from the source file systems 114.

Thus, the cloud provider 130 may host an enterprise-based application of an enterprise 105 by launching for each relevant source system 110 in the enterprise 105, a virtual machine instance 137 that runs a cloud machine image 128 corresponding to the source system 110. The set of virtual machine instances 137 in cloud provider 130 replicates the interconnection relationship of the source systems 110 and the operational objectives of the enterprise 105.

Some aspects of the environment of the cloud provider 130 will differ from those of the enterprise 105. For example, the cloud provider 130 may offer its users a choice of some set of predetermined operating system types and versions, such as CENTOS 5.3, CENTOS 5.6, UBUNTU 12.04, WINDOWS 2008, WINDOWS 2012, and the like, and these types/versions may differ from the types/versions deployed on the source systems 110 of the enterprise 105. To mitigate the differences, the cloud manager 120, based on the original operating system of the source system 110, generates an operating system image which is supported by the cloud provider 130 by modifying the replicated file system 124.

Further, the cloud provider 130 will have its own set of public network addresses (e.g., IP addresses) that it allocates to the enterprise-based applications that it hosts. These network addresses will differ from the public network addresses used by the enterprise 105.

The various source systems 110 of the enterprise 105 may also use devices with names that differ from those on the cloud provider 130, such as a device named "sda1" on a source system 110, and "xvdf1" on the cloud provider 130.

The site manager 100 (or the information provider 115) and the cloud manager 120 communicate to generate appropriately-modified representations of the source systems 110 on the cloud provider 130. This replicates the enterprise-based application (achieved by the collective operation of the source systems 110) on the cloud provider 130. The site manager 100 and the cloud manager 120 are now described in greater detail.

In one embodiment, the site manager 100 is implemented using a virtual machine. For example, one or more source systems 110 of the enterprise 105 might have hypervisors (e.g., ESX or FUSION by VMWARE) installed, in which case the site manager 100 could be implemented with a machine image created for, and executed by, those hypervisors. In another embodiment, the site manager 100 is implemented as a machine image created for, and executed by, a virtual machine of the cloud provider 130. In another embodiment, the site manager 100 is a physical machine accessible via the network 150. Thus, the location of the site manager 100 with respect to the enterprise 105 can differ in different embodiments, and may (but need not) be within either the enterprise 105 or the cloud provider 130. For the sake of simplicity, however, the site manager 100 is depicted in FIG. 1 as being an entity separate from the enterprise 105 and the cloud provider 130. Regardless of the location of the site manager 100, in embodiments in which the site manager 100 is used, the information provider module 115 of a source system 110 creates a network connection with the site manager when providing information about the source system.

In one embodiment, the cloud manager 120 is implemented as a machine image created for, and executed by, the virtual machine of the cloud provider 130. In such an embodiment, the cloud manager 120 executes within the cloud provider 130, although for the purposes of simplicity the cloud manager is depicted in FIG. 1 as being logically separate from the cloud provider 130.

The cloud manager 120 comprises a receiver module 121, a file database 122, configuration information 123, file systems 124, a customization module 126, a cloud image generation module 127, cloud machine images 128, and a cloning module 129.

The receiver module 121 receives the configuration information and file system data sent by the site manager 100 (or sent directly by the sender module 118) for the various source systems 110 and stores them locally as configuration information 123 and file system data 124. The file system data 124 thus correspond to the file systems 114 of the source systems 110 on the enterprise 105.

The file database 122 stores different sets of baseline operating systems for different cloud providers 130. A baseline operating system stored in the file database 122 includes driver files, boot files, and the like. The file database 122 may further store the additional files themselves. As an illustrative example simplified for purposes of clarity, Table 1 below illustrates several different LINUX operating systems of different distributions (i.e., CENTOS and UBUNTU) and several different WINDOWS operating systems (i.e., Windows 2008 and 2012), and the corresponding baseline operating system files which are stored in the file database 122 and for use by different cloud providers 130, as well as a cloud provider (i.e. AWS and AZURE) for each.

TABLE 1

| Source OS/version | Cloud provider | Files required |
|---|---|---|
| CentOS 5.3 | AWS | A, B, D |
| CentOS 5.5 | AZURE | A, D |
| CentOS 5.6 | AWS | A |
| Ubuntu 12.04 | AWS | A, B, C |
| Ubuntu 12.10 | AWS | A, B |
| Windows 2008 | AWS | W, X, Z |
| Windows 2008 | AZURE | W, X, Y |
| Windows 2012 | AWS | X, Z |
| . . . | . . . | . . . |

For each <operating system, version, cloud provider> tuple, there is a list of kernel files required to be added to the environment of the cloud provider 130, reflecting, for example, that those kernel files are needed to run software on the cloud provider, yet are not provided by the designated operating system and version. For example, referring to the example of Table 1, the <CentOS, 5.3, AWS> tuple has a corresponding set of kernel files {A, B, D}, reflecting, perhaps, that CentOS 5.3 lacks kernel files A, B, and D, which are necessary for the enterprise-based application to function within the hosting environment of AWS.

Note that although to simplify the example of Table 1 a single-letter identifier such as 'A' has been used, in practice concrete kernel file identifiers would be listed, such as full pathnames of files for the kernel files. It is further appreciated that the file database 122 need not represent information in tabular form, as in the example; rather, many data structures, such as trees, may provide an efficient implementation and may also be used.

It is additionally appreciated that certain information may be added to, or omitted from, that shown in Table 1. For example, in an embodiment solely directed to a particular cloud provider 130, there need not be a "Cloud provider" element in the table, since the identity of the cloud provider is implicit and fixed.

The customization module 126 customizes the file system data 124 obtained from the source system 110 in order to allow the enterprise-based application to properly function in the environment provided by the cloud provider 130. Specifically, in one embodiment the customization module 126 performs driver injection and image customization, and also creates a boot image suitable for the cloud provider 130. These operations are now explained in more detail.

(A) Kernel File Injection

The source systems 110 might be lacking in certain drivers or other files associated with the operating system kernel and required for the application to function properly on the cloud provider 130. Accordingly, the cloud customization module 126 performs kernel file injection (see step 375 of FIG. 3) so that the cloud machine images 128 have all the required kernel files.

In one embodiment, kernel file injection is accomplished by identifying relevant kernel files through comparison of the operating system type and version of the source system 110 with the cloud provider 130 that is to be used to host the enterprise-based application. The file database 122 can be used for this purpose. For example, referring again to the simplified example of Table 1, above, if the enterprise-based application were using CENTOS v. 5.3, and were intended to be hosted on AWS, then kernel files A, B, and D would be added to the file system data 124.

(B) Image Customization

Image customization involves analyzing and modifying the contents of existing files obtained from the source system 110. The image customization includes file system mounting customization, hostname and network address mapping customization, and network address allocation customization, each of which is now described in more detail.

(i) File System Mounting Customization

The source systems 110 and the cloud provider 130 may use different names to address the underlying storage devices. Such device names can be used in the file system mount table file to reference the file systems which reside on the named storage devices. For example, the primary drive on a web server of a given source system 110 might be named "sda1", whereas the primary drive of the environment provided by the cloud provider 130 might be named "xvdf1". Thus, an attempt to mount a file system using the device name "sda1" as a reference will fail in the cloud provider 130, since the storage device name has changed to "xvda1" in the cloud provider 130.

Accordingly, the customization module 126 customizes a mount table file for the given source system 110. For example, the mount table file for a LINUX operating system might be the file/etc/fstab. As a specific example, the file/etc/fstab on the source system 110 might contain the entry:

/dev/sda1/ext3 which specifies that one ext3 typed file system, which resides in storage device "/dev/sda1", should be mounted at the location "/" in the Linux system. As noted, the mount described by this line would lead to incorrect results within the cloud provider 130 if the cloud provider's storage drive were named "xvdf1", rather than "sda1" as in the source system 110.

In order to rectify this problem, the customization module 126 instead determines, for each file system of the source system 110, a unique ID corresponding to that file system. For example, in one embodiment the unique ID, which is stored in the metadata of the file system 114 on the source system 110, is retrieved and reported to cloud manager 120. The cloud manager 120 saves this unique ID into the metadata of the file system 124, and replaces the device name with this unique ID in the mount table file. For example, for the device named "/dev/sda1" of a given source system 110, the customization module 126 could retrieve the hexadecimal string "f6f514a9-2954-473c-9a47-664a4d4eb0d4" of the file system 114 from configuration information 123 as reported by information provider 115 on the source system 110. The customization module 126 could then write the hexadecimal string into the metadata for the file system 124 and also modify the entry of the file/etc/fstab from
/dev/sda1/ext3
to
UUID=f6f514a9-2954-473c-9a47-664a4d4eb0d4/ext3
which has the effect of mounting a file system, whose unique ID is "f6f514a9-,2954-473c-9a47-664a4d4eb0d4", at the root directory of a Linux system. Since the unique ID for the file system 114 has been written into the file system 124, as well as into the mount table file/etc/fstab, a Linux system can properly identify the file system, as referenced in the mount table file, to perform a file system mounting operation, regardless the name change of the underlying storage device. In another embodiment, the unique ID may be randomly generated, rather than read from the metadata of the file system 114.

(ii) Hostname and Network Address Mapping Customization

A static hostname-to-network address mapping specifies logical host names that will be associated with network addresses such as Internet protocol (IP) addresses. (For example, for a LINUX operating system, the file/etc/hosts might specify the hostname-to-network address mapping.) The static hostname-to-network address mapping provides appropriate mappings between host names and network addresses even if the local server designed for that purpose (e.g., a DNS server) is not currently available. Thus, network communications using hostnames specified by the hostname-to-network address mappings could continue properly, even if the local DNS server had malfunctioned, for example.

Many enterprise applications make reference to network addresses of the various source systems 110 associated with the application, e.g., in application configuration files, many of which are not documented or otherwise explained. Thus, it is tedious and error-prone to attempt to locate and revise these network addresses (e.g., in the application configuration riles) when migrating an enterprise-based application from an enterprise 105 to a cloud provider 130. Retaining the network addresses used in the enterprise 105, rather than updating the network addresses to those made available by the network provider, avoids this difficulty.

The customization module 126 generates a static hostname-to-network address mapping based on the source systems 110 identified by the system identification module 119. That is, for each identified system, the customization module 126 determines its IP address and its hostname, e.g., using operating system functionality such as the "hostname" command or system call. The system customization module 126 also generates variants of the hostname. For example, the system customization module 126 may obtain the hostname in its fully qualified form and generate variants by stripping away the domains, e.g., starting with the fully qualified hostname "machine.company.corp" and forming simplified variant hostnames "machine.company" and "machine". As a more detailed example, and referring ahead to FIG. 4A, assuming that the identified four source systems 416A-416D were found to have hostnames sugar2-ws1.company.corp, sugar2-ws1.company.corp, sugar2-1b.company.corp, and sugar2-db.company.corp and corresponding IP addresses 198.101.232.7, 198.101.232.200, 198.101.232.118, and 198.101.232.219, the customization module 126 might generate the following mappings:

127.0.0.1 localhost.localdomain localhost
198.101.232.7 sugar2-ws1.company.corp sugar2-ws1
198.101.232.200 sugar2-ws2.COMPANY.CORP sugar2-ws2
198.101.232.118 sugar2-db.COMPANY.CORP sugar2-db
198.101.232.219 sugar2-1b-node.COMPANY.CORP sugar2-1b-node The line "198.101.232.7 sugar2-ws1.company.corp sugar2-ws1" indicates, for example, that the fully-qualified hostname "sugar2-ws1.company.corp", and the shortened hostname "sugar2-ws1", are both aliases for the IP address "198.101.232.7." The generated mappings are then stored in a known address-hostname mapping file, such as the/etc/hosts file in the LINUX operating system.

(iii) Network Address Allocation Customization

The cloud provider 130 may require that virtual machine instance 137 dynamically obtain its network (e.g., IP) addresses, rather than using static address assignments, in order to more effectively manage its network infrastructure. Thus, in one embodiment the customization module 126 modifies the operating system settings stored in the file system data 124 and obtained from the source system 110 so as to enable dynamic address allocation. Thus, in one embodiment the customization module 126 changes, for the operating system settings corresponding to each source system 110, any static network address allocations to use the Dynamic Host Configuration Protocol (DHCP). More specifically, since operating system settings such as network address allocation are stored within the corresponding file system, the customization module 126 modifies the file systems 124 stored by the cloud manager 120 to reflect the change.

(iii) Boot Image Creation

The customization module 126 generates a cloud boot file system in the file systems defined by the file system data 124, e.g., by creating a new boot volume mapped to a /boot directory in the file systems at boot time.

If operating system versions of the source systems 110 are sufficiently old, they may not be able to properly boot up a virtual machine instance 137 on the cloud provider 130. Thus, in one embodiment the customization module 126 uses the version of the operating system provided by the cloud provider 130 to identify files that should be in the cloud boot file system. For example, if the operating system of one of the source systems 110 is before a particular known version (e.g., version 6.0 of CENTOS), then a particular given set of files is used (e.g., the versions of/boot/vmlinuz kernel, /boot/initrd, and the/boot/grub/menu.lst boot loader file that are stored within the file database 122); otherwise, the files already within the/boot directory from the source system 110 are used. In one embodiment, the file database 122 is used to determine which boot files are required, given a particular source operating system, operating system version, and cloud provider.

The customization module 126 further configures a boot loader for the application on the cloud provider 130. For example, for a LINUX system and the GRUB boot loader, the boot loader configuration file could be the file grub.conf within the grub/subfolder of the cloud boot file system. In one embodiment, the customization module 126 modifies the boot loader configuration file from the source system 110 to boot from the customized root file system described above with respect to file system mounting customization—that is, the customized root file system identified by the generated unique ID. For example, assume that the boot loader configuration file from the source system 110 contained the following line:

kernel /boot/vmlinuz-2.6.32-220.e16.x86_64 ro root=/dev/sda1 rd_NO_LUKS KEYBOARDTYPE=pc KEYTABLE=us LANG=en_US.UTF-8 nomodeset rhgb crashkernel=auto quiet rd_NO_MD quiet SYSFONT=latarcyrheb-sun16 rhgb crashkernel=auto rd_NO_LVM rd_NO_DM The customization module 126 could modify the "root" parameter to no longer refer to the device "/dev/sda1", but rather to refer to the unique root identifier "f6f514a9-2954-473c-9a47-664a4d4eb0d4". This permits the boot loader to properly boot the system, even when the physical device on which the/boot partition resides has a different name on the source system 110 from that on the cloud provider 130.

With the files within the file system data 124 properly configured, the cloud manager 120 generates a cloud machine image 128.

The cloud image generation module 127 causes generation of an image of each of the relevant source systems 110 within the enterprise 105 based on the (customized) contents of the file systems 124 and on the configuration information 123, and the resulting set of images is stored in the cloud machine images repository 128. For example, if the cloud provider 130 is AMAZON WEB SERVICES (AWS), the corresponding cloud machine images 128 are AMAZON Machine Image (AMI) objects.

In one embodiment, the cloud image generation module 127 generates an image using an application programming interface (API) of the cloud provider 130. For example, if the cloud provider is AMAZON WEB SERVICES, the generation of an image named "My_AMI" might be requested using the URL
https://ec2.amazonaws.com/?Action=RegisterImage&RootDeviceName=/dev/sda1&BlockDeviceMapping.1.DeviceName=/dev/sda1&Name=My_AMI&AUTHPARAMS.

As a result, each relevant source system 110 of the enterprise 105 has a corresponding cloud machine image 128 registered with, and stored on, the cloud provider 130.

The cloning module 129 can be used to generate instances (also referred to as "clones") of each application. Multiple instances of virtual machines running the same cloud machine images can be created to allow multiple instances of the enterprise application to be run independently by different users. Thus, for example, multiple application testers could be given different independent instances of the application to test, merely by requesting the creation of a new instance for each tester. Similarly, separate production and testing systems could be created by generating separate instances of the application, one for production and one for staging or testing (for example).

More specifically, when the cloning module 129 receives a request to create a clone of an application, the cloning module identifies the set of cloud machine images 128 corresponding to the source systems 110 for the enterprise 105 embodying the application. The cloning module 129 then requests the cloud provider 130 to launch the identified cloud machine images 128 into the virtual machine instances 137. In one embodiment, each identified cloud machine image 128 is launched in a separate virtual machine instance 137. Some cloud providers 130 create a single virtual private networking environment for all the virtual machine instances associated with the application and assign local IP address to each virtual machine instance in the virtual private networking environment.

The instance creation may be customized based on, for example, additional data known about the relevant source systems 110. For example, referring ahead to the user interface of FIG. 4A, some source systems 110 may be designated as private and others as public, with public systems having internet accessible IP addresses assigned in addition to their local IP addresses.

In one embodiment, the enterprise 105 and the cloud manager 120 include tunneling modules 113, 135 which act together to establish tunnels between the application running within the cloud provider 130 and the source systems 110 of the enterprise 105 and the services provided by the enterprise 105. Further details of the tunneling modules 113, 135 are provided below with respect to FIGS. 5 and 6.

Data Flow

Figure 2:
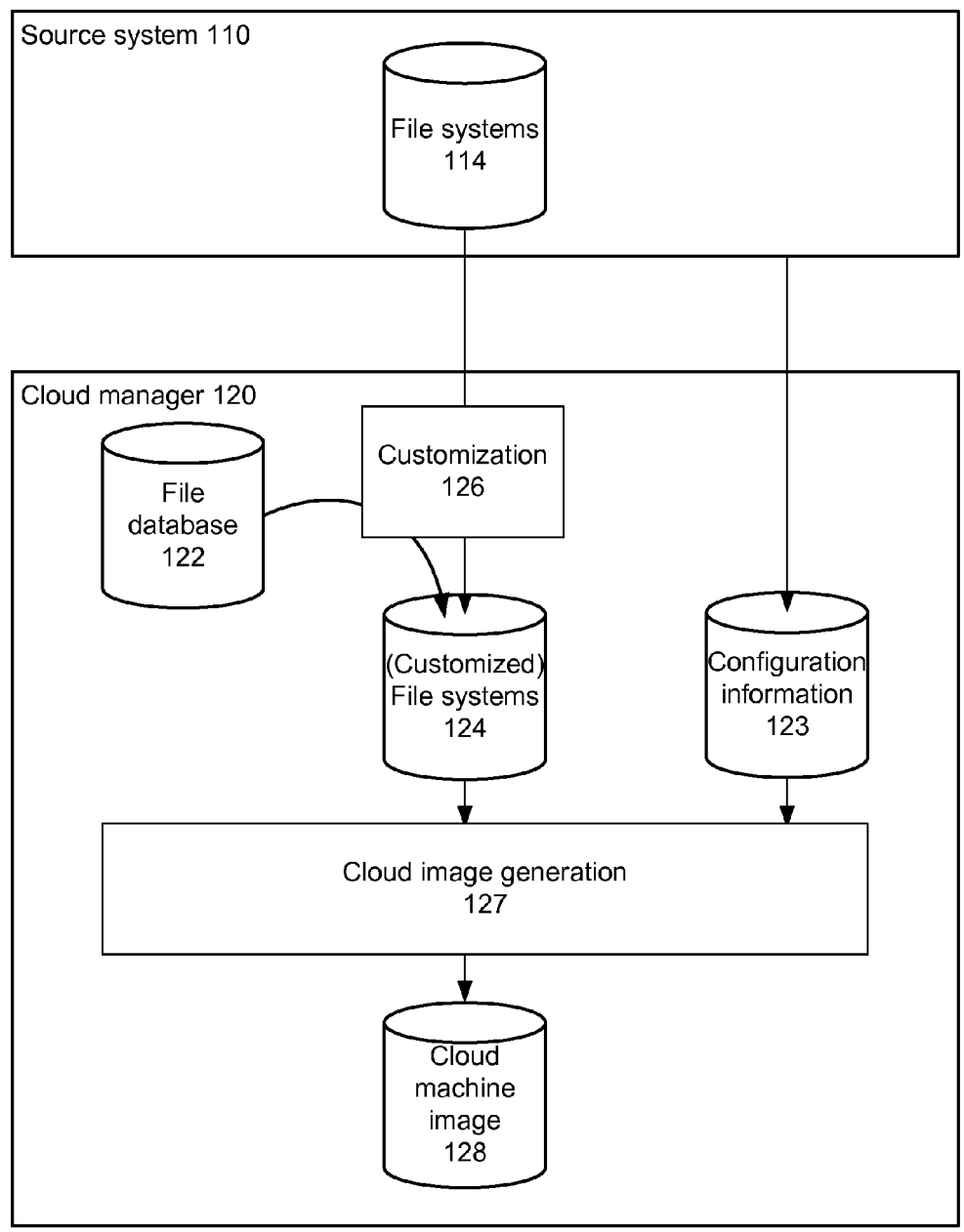
FIG. 2 illustrates the data flow that takes place when generating cloud machine images for a source system using the components of FIG. 1, according to one embodiment.

FIG. 2 illustrates the data flow that takes place when generating the cloud machine images 128 for a source system 110 using the components of FIG. 1, according to one embodiment.

The metadata and content of the file systems 114 of the source system 110 are provided to the customization module 126, which generates the customized file systems 124 of the cloud manager 120. The customization module 126 also controls injection of files of the file database 122 of the cloud manager 120 into the customized file systems 124 to ensure that the image of the source system 110 will have the necessary kernel files (e.g., drivers and libraries) needed to function properly on the cloud provider 130. Additionally, configuration information 123 is obtained from the source system 110.

The cloud image generation module 127 then produces, for the source system 110, a corresponding cloud machine image 128, based both on the customized file systems 124 and on the configuration information 123.

This process is repeated for each source system 110 determined (e.g., at least in part by the system identification module 119) to be associated with the enterprise-based application.

System Interactions

Figure 3:
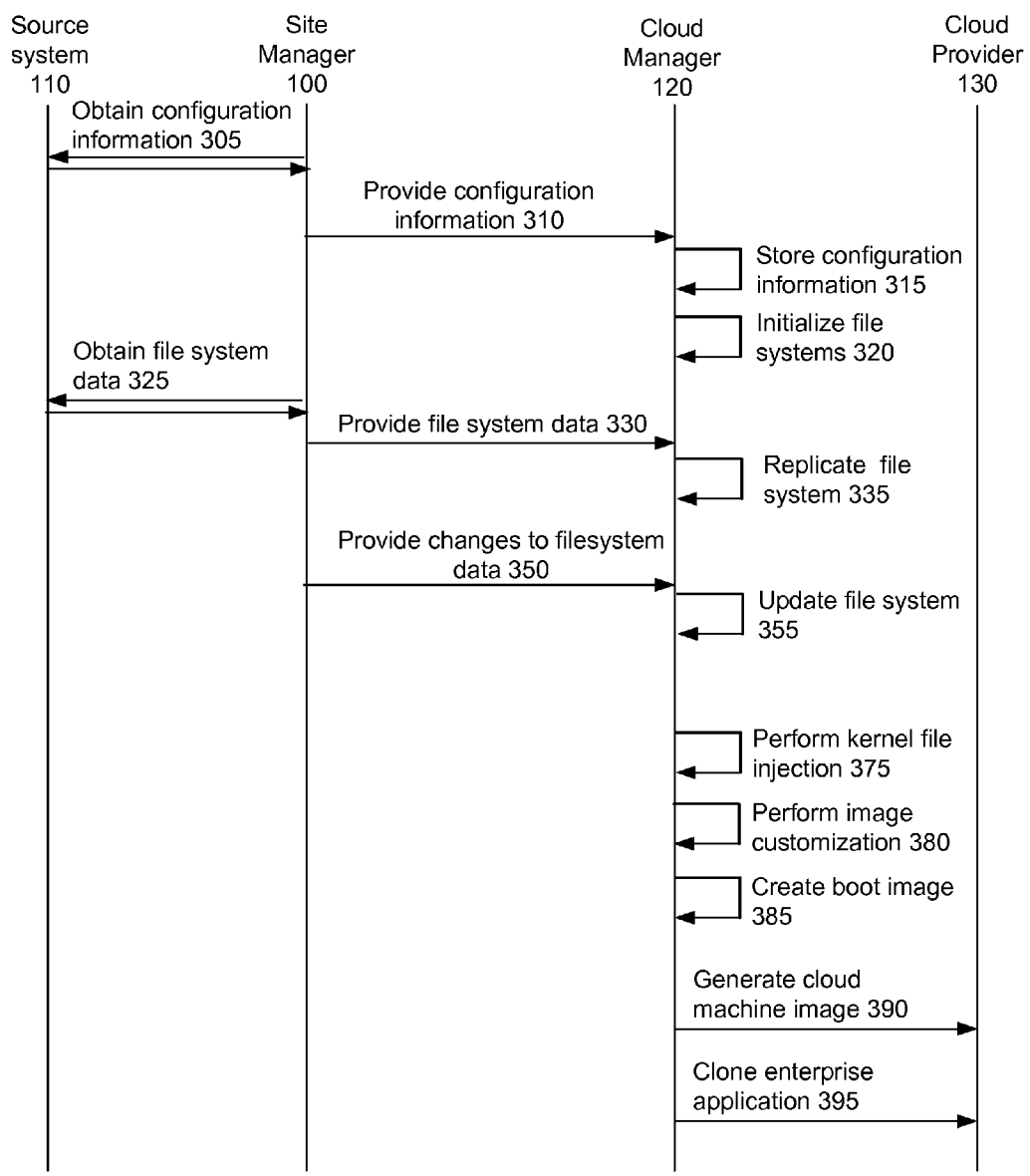
FIG. 3 illustrates the interactions that take place between the various components of FIG. 1 when generating a cloud machine image allowing an enterprise-based application to be hosted by the cloud provider, according to one embodiment.

FIG. 3 illustrates the interactions that take place between the source system 110, the site manager 100, the cloud manager 120, and the cloud provider 130 when generating a cloud machine image 128 allowing an enterprise-based application to be hosted by the cloud provider, according to one embodiment.

Initial Data Gathering

As discussed above, the site manager 100 obtains information from the source systems 110, including configuration information and data from the file systems 114. The site manager 100 further customizes the enterprise-based application (as embodied in the source systems 110) so that it will function properly on the cloud provider 130. Additionally, the site manager 100 may further monitor any changes to the source system 110, updating the file systems 124 to reflect the changes.

Specifically, the site manager 100 obtains 305 configuration information from the source system 110, as discussed above with respect to the configuration reader module 116 of FIG. 1. The site manager 100 provides 310 the obtained configuration information to the cloud manager 120, which stores 315 the configuration information as configuration information 123.

The cloud manager 120 uses the configuration information to initialize 320 the file systems on the cloud manager 120. (As noted above, in some embodiments the cloud manager 120 and its file systems 124 are physically stored within storage of the cloud provider 130.) Specifically, for every source file system 114 for which file system configuration information was obtained, the cloud manager 120 establishes a corresponding file system 124 as specified by the file system configuration information, e.g., by requesting the cloud provider 130 to provide a storage volume of the given type and having the given capacity. The cloud manager 120 then formats the storage volume into a given typed file system as reported from configuration information 123 regarding to the file system 114 on source system 110. This newly formatted file system is the file system 124, to which the action of providing 330 file system data (below) will transfer data.

In addition to obtaining configuration information, such as file system type and capacity, the site manager 100 also obtains 325 file system data—that is, the data stored by the file system—as described above with respect to the file system reader module 117 of FIG. 1. The site manager 100 provides 330 the obtained file system data to the cloud manager 120. The cloud manager 120 replicates 335 the file systems from the source system 110 by writing the file system data provided in step 330 into the file systems initialized at step 320. In one embodiment, the cloud manager 120 maintains a mapping relationship between each file system 114 of the source system 110 and the location of its corresponding file system 124 on cloud manager 120. Thus, the file system data from one file system 114, which arrives at step 330, will be placed at correct file system 124 in step 335.

File System Monitoring and Updating

The authors of the enterprise-based application represented by the source systems 110 may modify the enterprise-based application after the initial replication of steps 325-335. In order to properly reflect any such modifications, the site manager 100 (or the information provider 115) may further monitor the file systems 114 of the source systems 110 and propagate those changes to the corresponding file systems created on the cloud provider 130. In one embodiment, the file system reader 117 is configured to identify any changes to the file systems of the individual systems within the source system 110 and to provide 350 an indication of the changes to the cloud manager 120, which then causes corresponding modifications to the corresponding file systems of the cloud provider 130, thereby updating 355 the file systems. The file system reader 117 can identify the changes by (for example) periodically reading the file allocation tables of the different file systems and noting any file modification dates more recent than those previously noted. Changes to a file may be specified by the identifier of the file (e.g., file system ID and full pathname within the file system) and an indication that the file was changed, along with the complete data of the changed file (or a delta value that expresses the particular change made). Similarly, the addition of a new file may be specified by the identifier of the new file, an indication that the file was added, and all the data of the new file, and the deletion of a file may be specified by the identifier of the deleted file and an indication that the file was deleted.

As a result of the file system updating 355, the file systems on the cloud provider 130 are kept consistent with those on the source system 110. Thus, if the source systems 110 change, corresponding changes are reflected on in the cloud manager and/or the cloud provider 130.

Customization

The cloud manager 120 further customizes the data obtained from the source system 110 in order to allow the enterprise-based application to properly function in the environment provided by the cloud provider 130. Specifically, the cloud manager 120 performs kernel file injection 375 and image customization 380, and also creates 385 a boot image suitable for the cloud provider 130, as described above with respect to the customization module 126.

Cloning

The cloud manager 120 further can generate 390 cloud machine images 128 corresponding to the different source system 110, one cloud machine image per source system, as described above with respect to the cloud image generation module 127. The cloud manager 120 can also create 395 clones of the enterprise application by requesting the cloud provider 130 to launch the cloud machine images into virtual machine instances 137. Each clone operates independently of the others, so different users may independently operate the different clones as if they each constituted a separate enterprise 105.

User Interfaces

Figure 4A:
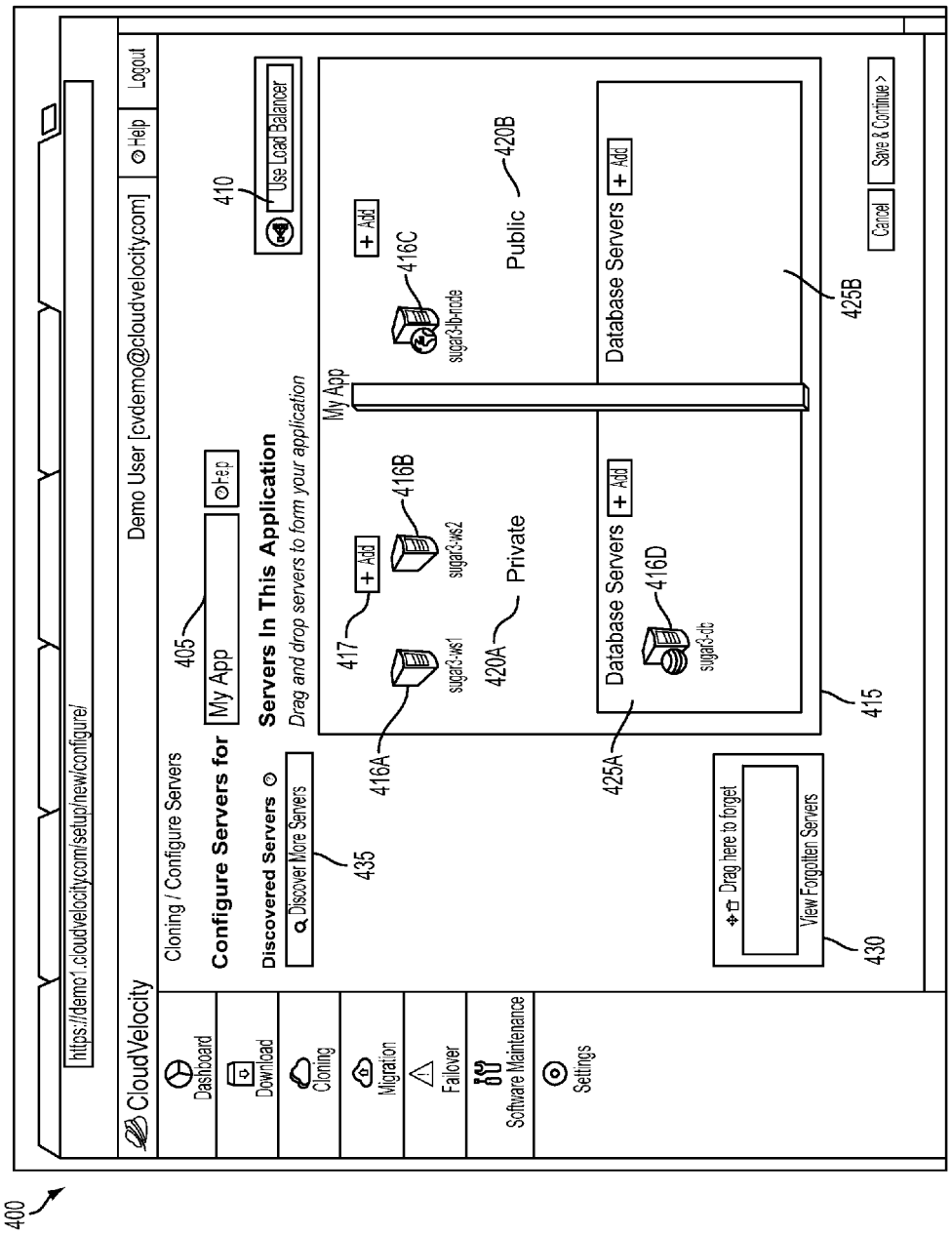
FIGS. 4A-4B respectively illustrate example graphical user interfaces used in the process of replicating an enterprise-based application on a cloud provider and creating instances of that enterprise-based application, according to one embodiment.
Figure 4B:
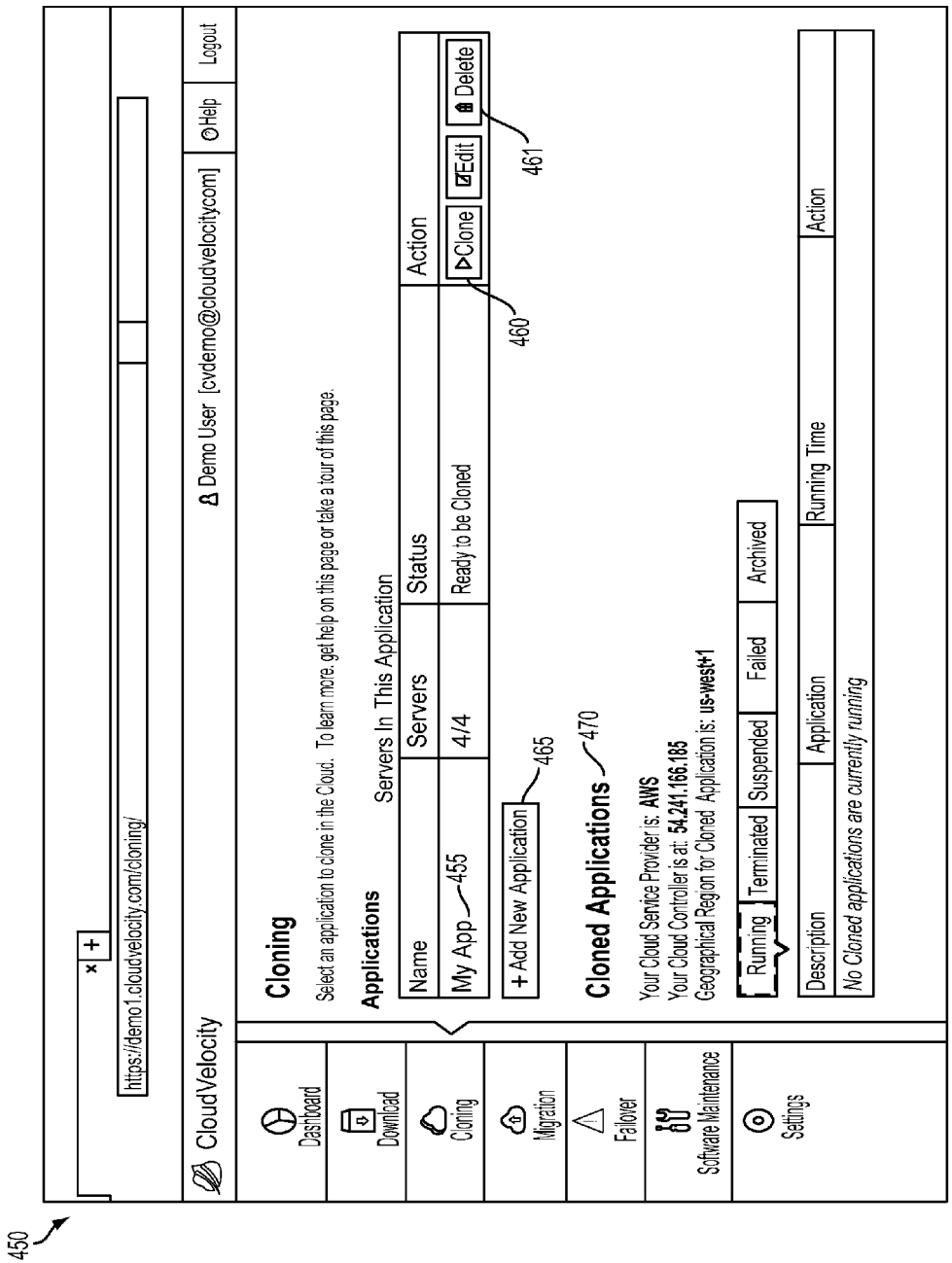

FIGS. 4A-4B respectively illustrate example graphical user interfaces used in the process of replicating an enterprise-based application on a cloud provider and creating instances of that application, according to one embodiment.

FIG. 4A illustrates a user interface 400 used by an employee or other authorized member of the enterprise 105 to identify the particular source systems 110 within the enterprise that make up the enterprise-based application, as well as specifying attributes of those source systems that are relevant to the replication of the enterprise-based application on the cloud provider 130.

An enterprise-based application made up of a set of source systems 110 of the enterprise 105 is assigned the name in text area 405 ("My App"), and the source systems to be replicated within the cloud provider 130 are depicted in the system area 415 of the user interface.

In the embodiment of FIG. 4A, the source systems are partitioned into private systems and public systems, respectively depicted in areas 420A and 420B, with source systems 416A, 416B, and 416D being private systems, and source system 416C being a public system. The source systems 110 placed in the private systems group 420A will be made non-accessible to outside systems when the enterprise-based application is launched on the cloud provider 130, whereas the systems of the public systems group 420B will be accessible. (To control accessibility, the private systems 420A may be assigned IP addresses from a private IP address range, for example, and the public systems 420B may be assigned IP addresses from a non-private IP address range.)

The source systems 110 may further be partitioned based on functionality. For example, in FIG. 4A the source systems 110 are partitioned based on whether they represent database servers, with systems in partitions 425A and 425B representing database servers, and those in other areas representing non-database servers. The source systems 110 may then be treated differently based on their identified functionality. For example, referring again to FIG. 3, source systems 110 identified as being database servers may be treated differently when providing file system data during steps 330 or 350 in order to provide the transactional properties necessary to achieve database data integrity, such as by copying data using a database-specific API.

In one embodiment, the user interface 400 initially displays source systems 110 identified by the system identification module 119 of FIG. 1. The user of the user interface 400 may then use the interface to move the systems into the appropriate area of the user interface, thereby specifying their properties (e.g., private/public visibility, or database/non-database functionality). The user may also select control 435 to request the system identification module 119 to attempt to discover additional source systems 110 within the enterprise 105, or controls such as Add button 417 to manually add a source system to one of the groups (e.g., group 420A). Identified source systems may also be moved into group 430 to be removed from the enterprise-based application, and will accordingly not be replicated on the cloud provider 130.

In one embodiment, the functionality upon which the partition is based is the provision of important services, such as database services or directory services. For example, any source systems 110 providing such services may be illustrated in a separate portion of the user interface 400 in the same way as the database servers were provided their own area in FIG. 4A. Such source systems 110 will then not be replicated on the cloud provider 130, since the services should continue to be provided locally, even when the remainder of the application is migrated to the cloud provider 130.

In one embodiment, application architectural components may also be added via the user interface 400. For example, checkbox 410 allows the user to specify whether the enterprise-based application should use a load balancer. Since the checkbox 410 has been enabled in the user interface 400 of FIG. 4, a load balancer system 416C is inserted within the public group 420B.

Once the enterprise-based application has been made available on the cloud provider 130 by replicating the source systems 110 of the enterprise 105 (e.g., those indicated in FIG. 4A), the application may be launched by creating an instance (also referred to as a "clone") of the replicated source systems 110. As noted, multiple independent sets of instances of the replicated source systems may be created.

FIG. 4B illustrates a user interface 450 used by an employee or other authorized member of the enterprise 105 to create instances of an enterprise-based application. The application list 455 contains the names of application configurations (corresponding to enterprises 105) that a user has replicated on the cloud provider 130. For each such application, the corresponding clone button 460 allows a user to request that a new instance of the application be created, as described above with respect to the cloning module 129. The delete button 461 allows a user to remove the replicated application (i.e., the cloud machine images 128) from the cloud provider 130.

The add new application button 465 allows creation of a new configuration of the application, corresponding to a different set of source systems 110, or different properties for the same systems. Referring again to FIG. 4A, for example, a new, separate configuration of the application could be created by adding an additional web server system within the private group 420A, or by removing the load balancer.

Application information area 470 summarizes information about the replicated applications of the user, such as the identity of the cloud provider 130 used to host the applications, and the various statuses of replicated applications for which instances have been created (e.g., which are running, which have been terminated, etc.). The applications for which instances have been created may be further managed. For example, the instances can be suspended, terminated, resumed, and the like.

Figure 5:
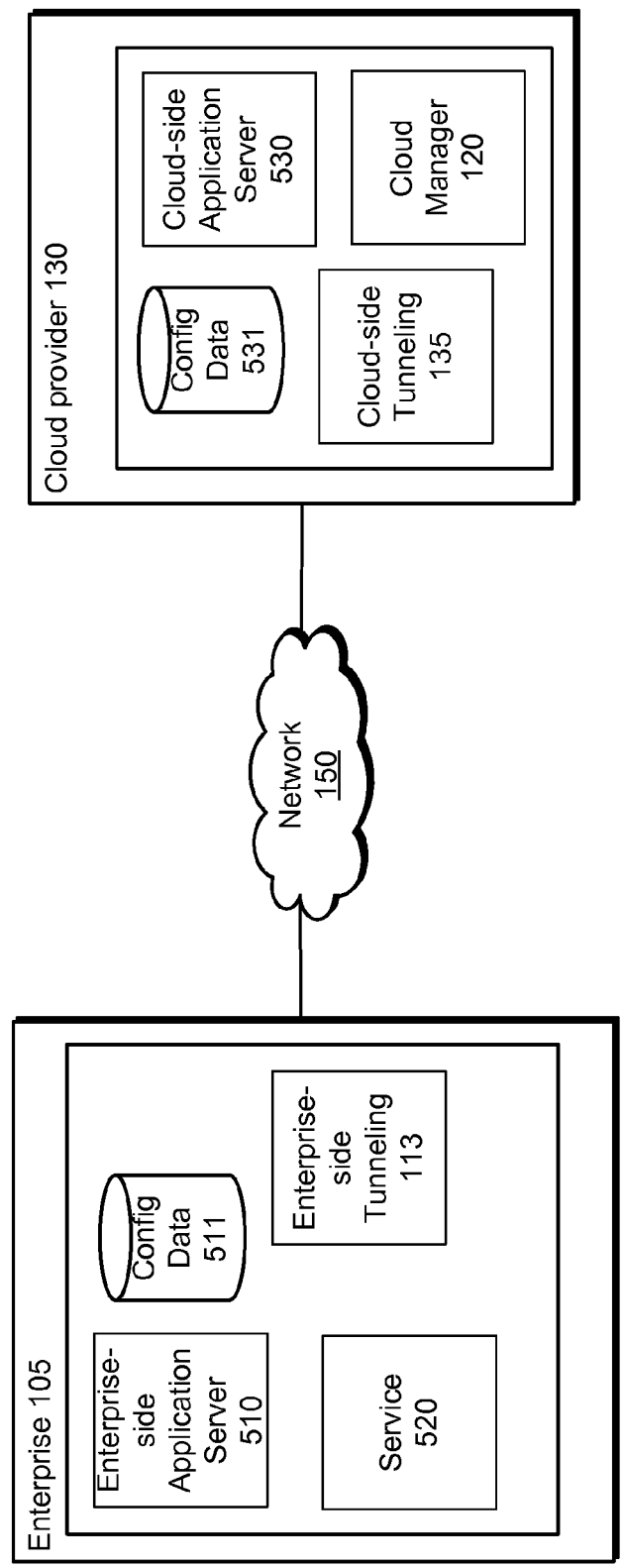
FIG. 5 illustrates a more concrete example of the environment of FIG. 1, in which tunneling is used to allow an application hosted on the cloud provider to access services provided by the enterprise 105, according to one embodiment.

FIG. 5 illustrates a more concrete example of the environment of FIG. 1, in which tunneling is used to allow the application running on the cloud provider 130 to access services provided by the enterprise 105, according to one embodiment. The enterprise-side application server 510 represents a particular source system 110 of the enterprise 105 that provides all or a portion of the logic of the overall application. Similarly, the cloud-side application server 530 represents the executed machine image of the enterprise application server 510 when running within the cloud provider 130. The enterprise 105 has one or more services 520, which represent a service (e.g., a database service or directory service) provided by a source system 110 that is not executed on the cloud provider 130 due to the preferences of those responsible for the enterprise 105. For example, the policy of the enterprise 105 may prohibit making the service 520 directly accessible outside the enterprise.

Since one or more services 520 are not directly available within the cloud provider 130, the cloud-side application server 530 needs an indirect way to use the services. Accordingly, an enterprise-side tunneling component 113 and a cloud-side tunneling component 135 together establish secure tunnels by which the cloud-side application server 530 can send requests to the service 520. The establishment and use of the tunnels are described in more detail below with respect to FIG. 6.

The enterprise-side application server 510 stores or has access to configuration data 511 (e.g., a configuration file) that specifies attributes of the tunneling process. An example set of configuration data 511 according to one embodiment is provided below in Table A.

Table A
   remote_ssh_ip=192.168.1.171
   remote_ssh_port=7550
   forward_tunnel_remote_destination_ip=192.168.1.51
   forward_tunnel_remote_destination_port=22
   is_first_establish_forward_tunnel=True The example configuration data 511 of Table A includes the port number and destination IP address (the private IP address of the enterprise-side tunneling module 113) used to form a secure connection, as well as the private IP address and port number of the cloud-side application server 530 used as part of a tunnel between the application servers 510, 530.

Similarly, the cloud-side application server 530 stores or has access to configuration data 531 (e.g., a configuration file) that specifies attributes of the tunneling process. An example set of configuration data 531 according to one embodiment is provided below in Table B.

Table B
   [ssh_tunnel]
   ssh_config_file=/opt/denali/etc/ssh.config
   ssh_key_file=/opt/denali/etc/remotenetworkservice_ssh_key
   reverse_tunnel_local_destination_ip=127.0.0.1
   reverse_tunnel_local_destination_port=50000
   reverse_tunnel_remote_listening_ip=127.0.0.1
   reverse_tunnel_remote_listening_port=50000

[service_ldap_junkang-wordpress-web1_389]
name=ldap_junkang-wordpress-web1_389
protocol=TCP
real_server_ip=junkang-wordpress-web1
real_server_port=389
proxy_server_port=50101
proxy_server_ip=127.0.0.1
[service_ldap_127.0.0.1_389]
name=ldap_127.0.0.1_389
protocol=TCP
real_server_ip=127.0.0.1
real_server_port=389
proxy_server_port=50100
proxy_server_ip=127.0.0.1
[service_192.168.1.1_53]
name=192.168.1.1_53
protocol=UDP
real_server_ip=192.168.1.1
real_server_port=53
proxy_server_port=53
proxy_server_ip=127.0.0.1

The configuration data 531 of cloud-side application server 530 contains information not included within the configuration data 511 of the enterprise-side application server 510, such as information about how to access various services 520 of the enterprise 105.

Figure 6:
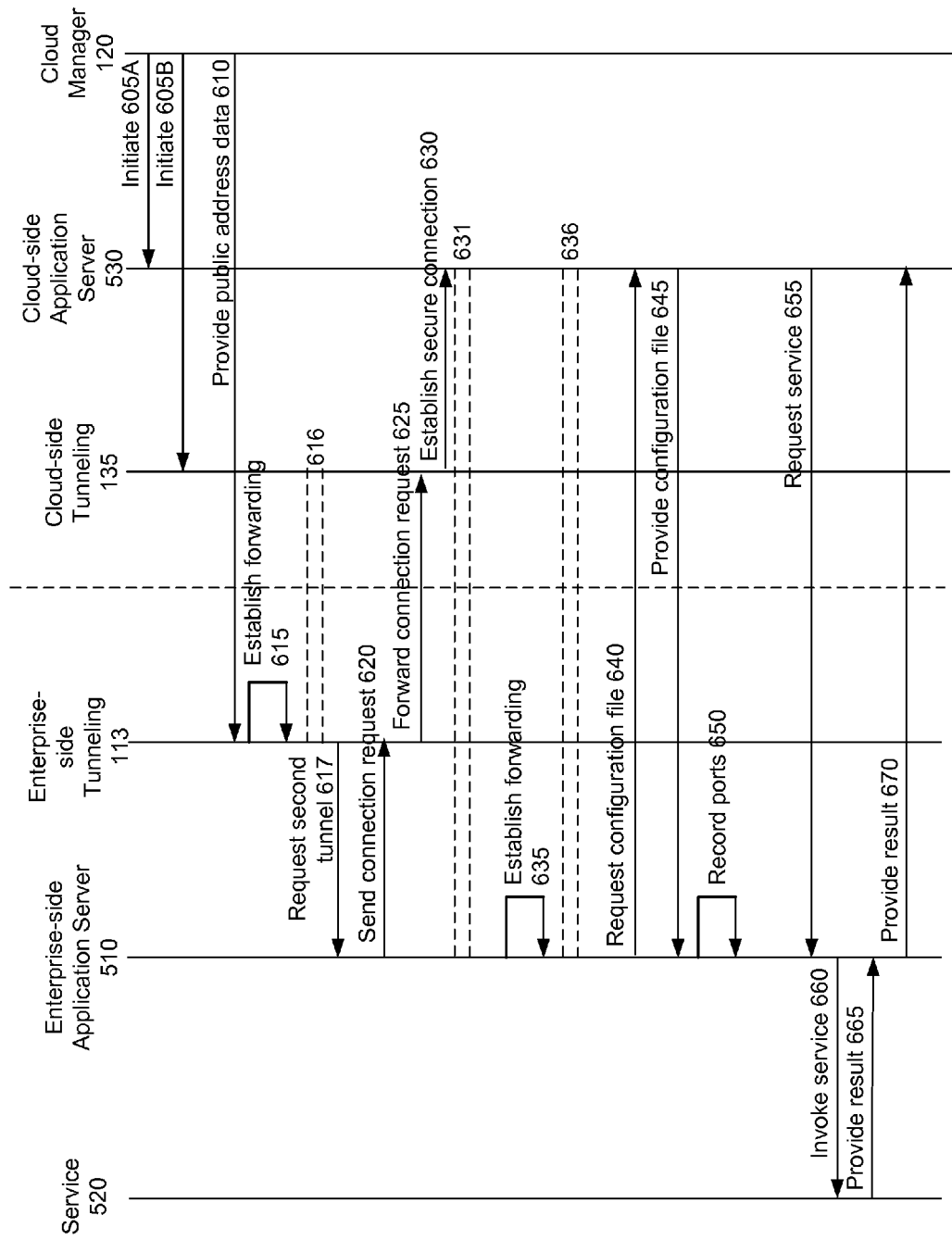
FIG. 6 illustrates the interactions that take place between the various components of FIG. 5 when establishing tunnels enabling transparent access to a remote service, according to one embodiment.

FIG. 6 illustrates the interactions that take place between the various components of FIG. 5 when establishing tunnels enabling transparent access to a remote service, according to one embodiment.

The components of the enterprise—namely, the service 520, the enterprise-side application server 510, and the enterprise-side tunneling module 113—begin with private IP addresses, denoted $IP_{ES}$, $IP_{EA}$, and $IP_{ET}$, respectively. Since the IP addresses are private, they cannot be used outside of the enterprise 105 by the cloud provider 130 to communicate directly with their corresponding components inside the enterprise.

The cloud manager 120 initiates 605A execution of the cloud-side application server 530 by creating a clone of the application, as in step 395 of FIG. 3. It also initiates 605B the application's cloud-side tunneling component 135.

The cloud manager 120 assigns the cloud-side application server 530 with a private IP address, donated $IP_{CA}$ and assigns the cloud-side tunneling module 135 with a public IP address, $IP_{CT}$, and port $P_{CT}$ (e.g., port 22, the port for the Secure Shell (SSH) protocol) by which the cloud-side tunneling module can be reached from outside the private network address space of the application running within the cloud provider 130. The cloud manager 120 further provides 610 the enterprise-side tunneling module 113 with $IP_{CT}$, $P_{CT}$, $IP_{CA}$ and $P_{CA}$ so that it has the necessary connection information to communicate with the cloud-side tunneling module 135 and the cloud-site application server 530.

The enterprise-side tunneling module 113 picks one of its own unused ports, denoted $P_{FT}$, and uses the received $IP_{CT}$ and $P_{CT}$ to establish 615 port forwarding from enterprise-side tunneling module 113's IP address $IP_{ET}$ and port $P_{FT}$ to the cloud-side tunneling module 135 at $IP_{CT}$ and $P_{CT}$. As a result, any packets sent to the enterprise-side tunneling module 113 at IP address $IP_{ET}$ and on port $P_{FT}$ will be forwarded to the cloud-side tunneling module 135. This port forwarding operation 615 conceptually establishes a first tunnel 616 between the enterprise 105 and the cloud provider 130, and more specifically from enterprise-side tunneling module 113 to cloud-side tunneling module 135.

Upon successful configuration 615 of port forwarding, the enterprise-side tunneling module 113 will send 617 a request to enterprise-side application server 510 to initialize a second tunnel between enterprise-side application server 510 and cloud-side application server 530. The body of the request 617 will contain the cloud-side application server 530's IP address $IP_{CA}$ and port $P_{CA}$, which were originally provided by cloud manager 120 at an earlier step 610.

The enterprise-side application server 510 initiates another secure connection (which will eventually become secure connection 631) over the first tunnel by sending 620 a request for the secure connection to the enterprise-side tunneling module 113 at IP address $IP_{ET}$ and port $P_{FT}$; the request contains the private IP address $IP_{CA}$ and port $P_{CA}$ of the cloud-side application server 530 within the body of the packet. Due to the establishment of the first tunnel at step 615, the request for this secure connection is forwarded 625 from the enterprise-side tunneling module 113 over the first tunnel 616 to the cloud-side tunneling module 135. The cloud-side tunneling module 135 extracts the private address $IP_{CA}$ and $P_{CA}$ from the body of the packet and accordingly establishes 630 a secure connection 631 with the cloud-side application server 530. At this point, cloud-side tunneling module 135 will start forwarding any request for a secure connection to the cloud-side application server 530's private IP address $IP_{CA}$ and port $P_{CA}$.

The enterprise-side application server 510 establishes 635 port forwarding to the cloud-side application server 530 (at the private IP address $IP_{CA}$ of the cloud-side application server) for packets received locally (e.g., IP address 127.0.0.1) on a particular port (hereinafter denoted $P_{FT2}$). This establishes a second tunnel 636, which operates over the secure connection 631, which in turn operates over the first tunnel 616. As a result, any packets sent to the enterprise-side application server 510 on port $P_{FT2}$ are securely forwarded over the second tunnel 636 to the cloud-side application server 530. This marks the completion of the second tunnel initialization that was initiated by request 617.

With the second tunnel 636 established, the enterprise-side application server 510 uses functionality of the secure connection 631 (e.g., the "cp" command of an SSH connection) to request 640 a copy of the configuration data 531 of the cloud-side application server 530, which the cloud-side application server accordingly provides 645. (More specifically, the enterprise-side application server 510 sends a packet to 127.0.0.1 on port $P_{FT2}$ containing a command, such as "cp," to be executed by a process implementing the secure connection. This packet is forwarded over the second tunnel 636 via the secure connection 631 due to the use of destination address 127.0.0.1 and port $P_{FT2}$, and the process on the cloud-side application server 530 implementing the secure connection executes the command, providing 645 the configuration data 531 back to the enterprise-side application server 510.)

In configuration data 531, each service 520 available on enterprise-side application will have a corresponding connection information entry (IP protocol, IP address and port—e.g., protocol TCP, IP address 127.0.0.1 and port 50000), herein denoted as ServiceInfo$_s$. ServiceInfo$_s$ can either be an address within the private address space of cloud provider 130, or the local address (e.g 127.0.0.1) of cloud-side application server 530. The cloud-side application server 530 will be able to connect using the ServiceInfo$_s$ to reach the corresponding enterprise-side service 520. There are a few ways that the ServiceInfo$_s$ is presented to an application running on the cloud-side application server 530. While modifying the filesystem data at (for example) step 350 of FIG. 3, the cloud manager 120 can parse the application's configuration file to determine the enterprise-side connection information of service 520. The cloud manager 120 can then replace that enterprise-side information with a dynamically generated ServiceInfo$_s$ and save the mapping between service 520 and ServiceInfo$_s$ in configuration data 531. Hence, at the time that the cloud-side application server 530 is booted 605A by the cloud manager 120, the cloud-side application server 530 will already be configured to use the ServiceInfo$_s$ to reach the enterprise-side service 520 without the need for any manual configuration. Alternatively, the application can also be manually configured after step 605A to use ServiceInfo$_s$.

As noted, the configuration data 531 specifies information used to access the service(s) 520 available on the enterprise 105. Thus, using the configuration data 531, the enterprise-side application server 510 enables access to services by the cloud-side application server 530 by recording 650 the ServiceInfo$_s$ for which it will respond to requests from the cloud-side application server 530.

With the secure connection 631 established 630, and with the ports recorded 650 by the enterprise-side application server 510, the cloud-side application server 530 can request the use of a service by sending 655 the request using the address and port data of the corresponding ServiceInfo$_s$ in configuration data 531; this causes the request to be sent through the tunnel 636, which in turn operates over the first tunnel 616. The enterprise-side application server 510 receives the request 655 on the other side of the tunnel 636, invokes 660 the service 520 and receives the result that the service provides 665. It then returns 670 the provided result from step 665 back to the cloud-side application server 530 via the tunnel 636 (using the first tunnel 616). Since the secure connection 631 is secure (e.g., encrypted), information can be safely provided to/from the service 520, even outside of the enterprise 105 across the network 150.

ADDITIONAL CONSIDERATIONS

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by an enterprise system for enabling a remote application server hosted by a cloud provider system to access services local to the enterprise system, the method comprising:
   establishing a first tunnel between the enterprise system and the cloud provider system;
   establishing a secure connection over the first tunnel, the secure connection being encrypted;
   obtaining configuration data from the cloud provider system over the secure connection, the configuration data including information on one or more services local to the enterprise system, the obtaining comprising sending a packet containing a file copy command to be executed by a process implementing the secure connection, wherein the process implementing the secure connection is SSH (Secure Shell), and the file copy command is the SSH copy command; and
   enabling access to the one or more services by the remote application server, using the obtained configuration data.

2. The computer-implemented method of claim 1, further comprising:

receiving a request for one of the services from the remote application server; and
responsive to the enabling:
invoking the requested service, and
providing a result of the invocation of the requested service to the remote application server over the secure connection.

3. The computer-implemented method of claim 1, wherein establishing the first tunnel comprises:
receiving, from the cloud provider system, public address information of a tunneling module of the cloud provider system; and
establishing forwarding of packets received by a tunneling module of the enterprise system on a first port, to a public network address of the tunneling module on a second port specified in the public address information.

4. The computer-implemented method of claim 3, wherein establishing the secure connection comprises:
sending a request for the secure connection to the tunneling module of the enterprise system, a body of the request including a private network address of the remote application server; and
forwarding the request from the tunneling module of the enterprise system over the first tunnel to the tunneling module of the cloud provider system.

5. A non-transitory computer-readable storage medium storing instructions executable by a processor, the instructions comprising:
instructions for establishing a first tunnel between the enterprise system and the cloud provider system;
instructions for establishing a secure connection over the first tunnel;
instructions for obtaining configuration data from the cloud provider system over the secure connection, the configuration data including information on one or more services local to the enterprise system, the obtaining comprising sending a packet containing a file copy command to be executed by a process implementing the secure connection, wherein the process implementing the secure connection is SSH (Secure Shell), and the file copy command is the SSH copy command; and
instructions for enabling access to the one or more services by the remote application server, using the obtained configuration data.

6. The non-transitory computer-readable storage medium of claim 5, the instructions further comprising:
instructions for receiving a request for one of the services from the remote application server; and
instructions for, responsive to the enabling:
invoking the requested service, and
providing a result of the invocation of the requested service to the remote application server over the secure connection.

7. The non-transitory computer-readable storage medium of claim 5, wherein establishing the first tunnel comprises:
receiving, from the cloud provider system, public address information of a tunneling module of the cloud provider system; and
establishing forwarding of packets received by a tunneling module of the enterprise system on a first port, to a public network address of the tunneling module on a second port specified in the public address information.

8. The non-transitory computer-readable storage medium of claim 7, wherein establishing the secure connection comprises:
sending a request for the secure connection to the tunneling module of the enterprise system, a body of the request including a private network address of the remote application server; and
forwarding the request from the tunneling module of the enterprise system over the first tunnel to the tunneling module of the cloud provider system.

9. The non-transitory computer-readable storage medium of claim 5, the instructions further comprising instructions for establishing a second tunnel between the remote application server hosted by the cloud provider system and an application server of the enterprise system.

10. The non-transitory computer-readable storage medium of claim 5, the instructions further comprising:
instructions for, for at least one source system of a plurality of source systems of the enterprise system that together provide an enterprise-based computer software application to users:
obtaining configuration information associated with the source system;
obtaining file system information describing one or more file systems of the source system, a first one of the file systems storing operating system files in a boot directory;
replicating the file systems and files of the file systems within a cloud manager system located remotely from the enterprise system, using the obtained file system information;
identifying, based on a version of an operating system of the source system, a set of boot files;
replacing operating system files in the boot directory of the first one of the replicated file systems with the identified set of boot files;
causing generation of an image of the source system using the obtained configuration information and the replaced files in the boot directory of the replicated file system, the generated image executable within a virtual machine of the remote application server hosted by the cloud provider system; and
instructions for receiving a plurality of requests to execute the enterprise-based application on the remote application server hosted by the cloud provider system; and
instructions for, for each of the plurality of requests, causing the remote application server to execute the images generated for the plurality of source systems; and
instructions for wherein the requests cause the executed images to request the services local to the enterprise system.

11. A computer system comprising:
a computer processor; and
a computer program stored on a non-transitory computer-readable storage medium and executable by the computer processor, and comprising:
instructions for establishing a first tunnel between the enterprise system and the cloud provider system;
instructions for establishing a secure connection over the first tunnel;
instructions for obtaining configuration data from the cloud provider system over the secure connection, the configuration data including information on one or more services local to the enterprise system, the obtaining comprising sending a packet containing a file copy command to be executed by a process implementing the secure connection, wherein the process implementing the secure connection is SSH (Secure Shell), and the file copy command is the SSH copy command; and instructions for enabling access to the one or more services by the remote application server, using the obtained configuration data.

12. The computer system of claim 11, the computer program further comprising:
   instructions for receiving a request for one of the services from the remote application server; and
   instructions for, responsive to the enabling:
      invoking the requested service, and
      providing a result of the invocation of the requested service to the remote application server over the secure connection.

13. The computer system of claim 11, wherein establishing the first tunnel comprises:
   receiving, from the cloud provider system, public address information of a tunneling module of the cloud provider system; and
   establishing forwarding of packets received by a tunneling module of the enterprise system on a first port, to a public network address of the tunneling module on a second port specified in the public address information.

14. The computer system of claim 13, wherein establishing the secure connection comprises:
   sending a request for the secure connection to the tunneling module of the enterprise system, a body of the request including a private network address of the remote application server; and
   forwarding the request from the tunneling module of the enterprise system over the first tunnel to the tunneling module of the cloud provider system.

15. The computer system of claim 11, the non-transitory computer-readable storage medium further comprising instructions for establishing a second tunnel between the remote application server hosted by the cloud provider system and an application server of the enterprise system.

16. The computer system of claim 11, the non-transitory computer-readable storage medium further comprising:
   instructions for, for at least one source system of a plurality of source systems of the enterprise system that together provide an enterprise-based computer software application to users:
      obtaining configuration information associated with the source system;
      obtaining file system information describing one or more file systems of the source system, a first one of the file systems storing operating system files in a boot directory;
      replicating the file systems and files of the file systems within a cloud manager system located remotely from the enterprise system, using the obtained file system information;
      identifying, based on a version of an operating system of the source system, a set of boot files;
      replacing operating system files in the boot directory of the first one of the replicated file systems with the identified set of boot files;
      causing generation of an image of the source system using the obtained configuration information and the replaced files in the boot directory of the replicated file system, the generated image executable within a virtual machine of the remote application server hosted by the cloud provider system; and
   instructions for receiving a plurality of requests to execute the enterprise-based application on the remote application server hosted by the cloud provider system; and
   instructions for, for each of the plurality of requests, causing the remote application server to execute the images generated for the plurality of source systems; and
   instructions for wherein the requests cause the executed images to request the services local to the enterprise system.

17. The computer-implemented method of claim 1, further comprising establishing a second tunnel between the remote application server hosted by the cloud provider system and an application server of the enterprise system.

18. The computer-implemented method of claim 1, further comprising:
   for at least one source system of a plurality of source systems of the enterprise system that together provide an enterprise-based computer software application to users:
      obtaining configuration information associated with the source system;
      obtaining file system information describing one or more file systems of the source system, a first one of the file systems storing operating system files in a boot directory;
      replicating the file systems and files of the file systems within a cloud manager system located remotely from the enterprise system, using the obtained file system information;
      identifying, based on a version of an operating system of the source system, a set of boot files;
      replacing operating system files in the boot directory of the first one of the replicated file systems with the identified set of boot files;
      causing generation of an image of the source system using the obtained configuration information and the replaced files in the boot directory of the replicated file system, the generated image executable within a virtual machine of the remote application server hosted by the cloud provider system; and
   receiving a plurality of requests to execute the enterprise-based application on the remote application server hosted by the cloud provider system; and
   for each of the plurality of requests, causing the remote application server to execute the images generated for the plurality of source systems; and
   wherein the requests cause the executed images to request the services local to the enterprise system.

* * * * *